United States Patent Office 2,923,752
Patented Feb. 2, 1960

---

2,923,752

PROCESS FOR STABILIZING RUBBER CONTAINING COPPER AGAINST OXIDATION

Boris Nicholas Leyland and Ronald Lee Stafford, Manchester, England, assignors to Imperial Chemical Industries Limited, London, England, a corporation of Great Britain No Drawing. Application December 22, 1955
Serial No. 554,612

Claims priority, application Great Britain
December 31, 1954

3 Claims. (Cl. 260—752)

This invention relates to rubber antioxidant mixtures and their application to natural rubber in order to protect the rubber against deterioration by oxidation both before and after vulcanisation, especially in the presence of copper or manganese.

According to the present invention we provide a process for protecting natural rubber against deterioration by oxidation, especially in the presence of copper or manganese, which comprises incorporating into the rubber, at any suitable stage before curing, at least one mercaptoarimidazole and at least one N:N'-disubstituted diaryl; alkyl, aryl; or cycloalkyl, aryl p-phenylene diamine.

The mercaptoarimidazole may be used as such or in the form of its metal salt, for example its zinc, magnesium or calcium salt. The preferred mercaptoarimidazole is 2-mercaptobenzimidazole but others may be used, for example 2:2'-dibenzimidazyl disulphide.

We are aware that it has already been proposed to use mixtures of antioxidants generally, and in particular, phenyl-α-naphthylamine and phenyl-β-naphthylamine, with mercaptoarimidazoles in order to enhance the antioxidant effect. However it has not hitherto been observed that any special effect with respect to oxidation in the presence of copper or manganese is obtained and it has not been proposed to use mixtures of the N:N'-disubstituted p-phenylene diamines of our invention with mercaptoarimidazoles. We have discovered that such mixtures have an unexpected, outstanding effect on the oxidation of natural rubber in the presence of copper or manganese and our present invention is based upon this discovery.

Suitable N:N'-disubstituted p-phenylene diamines include N:N'-di-β-naphthyl-p-phenylene diamine, N:N'-di-α-naphthyl-p-phenylenediamine, N:N'-diphenyl-p-phenylene diamine. N-cyclohexyl-N'-phenyl-p-phenylene diamine, N-sec.butyl-N'-β-naphthyl-p-phenylene diamine and N:N'-dicyclohexyl-p-phenylene diamine.

The proportion of mercaptoarimidazole to be used in the process of this invention may be from about 50% to about 200% of the weight of the N:N'-disubstituted p-phenylene diamine; preferably the proportion is about 100%. The amount of the combined agents used in the rubber is conveniently from 0.5% to 4.0% of the weight of the rubber hydrocarbon.

The efficacy of the process of this invention may be even further enhanced by the further incorporation into the rubber of a copper-sequestering agent, for example ethylene diamine tetracetic acid or a metal salt thereof, disalicylal alkylene diamines, 8-hydroxy-quinoline or p-aminophenol. Suitable proportions of the agents are from 3% to 10% of the total weight of the copper-inhibiting system.

The agents may be added to the rubber mix singly or in combination. In the latter case it is convenient to use the agents as a preformed mixture and such preformed mixtures of mercaptoarimidazole, N:N'-disubstituted p-phenylene diamine and, optionally, copper-sequestering agent form a further feature of this invention.

The invention is illustrated but not limited by the following examples in which parts and percentages are by weight.

Example 1

Vulcanisable rubber compounds were made up by the conventional method according to the following formulae:

| Mix | A | B | C | D |
|---|---|---|---|---|
| Pale crepe rubber | 100 | 100 | 100 | 100 |
| Zinc oxide | 10 | 10 | 10 | 10 |
| Blanc fixe | 75 | 75 | 75 | 75 |
| Stearic acid | 1 | 1 | 1 | 1 |
| Sulphur | 3 | 3 | 3 | 3 |
| Diphenylguanidine | 0.5 | 0.5 | 0.5 | 0.5 |
| Copper stearate | 0.2 | 0.2 | 0.2 | 0.2 |
| N:N'-di-β-naphthyl-p-phenylenediamine | 2 | 1 | | |
| N-cyclohexyl-N'-phenyl-p-phenylenediamine | | | 2 | 1 |
| 2-mercaptobenzimidazole | | 1 | | 1 |

The mixes were vulcanised for 150 minutes at 141° C. The antioxidant effect was measured by observing the time in hours to absorb a given amount of oxygen. The sheet was enclosed in a glass cell maintained at 90° C. and containing oxygen. The amount of oxygen absorbed was calculated from the rise of mercury in a simple manometer tube attached to the glass cell.

| Mix | A | B | C | D |
|---|---|---|---|---|
| Time in hours to attain $O_2$-uptake of: | | | | |
| 0.5% | 25.5 | 34.2 | 34.2 | 56.3 |
| 1.0% | 47.2 | 66.8 | 66.7 | 101.3 |

Similar compounds as given above, vulcanised and tested in the same way but containing phenyl-α-naphthylamine and phenyl-β-naphthylamine as anti-oxidants were also made for comparison.

| Mix | a | b | c | d |
|---|---|---|---|---|
| Pale crepe rubber | 100 | 100 | 100 | 100 |
| Zinc oxide | 10 | 10 | 10 | 10 |
| Blanc fixe | 75 | 75 | 75 | 75 |
| Stearic acid | 1 | 1 | 1 | 1 |
| Sulphur | 3 | 3 | 3 | 3 |
| Diphenylguanidine | 0.5 | 0.5 | 0.5 | 0.5 |
| Copper stearate | 0.2 | 0.2 | 0.2 | 0.2 |
| Phenyl-α-naphthylamine | 2 | 1 | | |
| Phenyl-β-naphthylamine | | | 2 | 1 |
| 2-mercaptobenzimidazole | | 1 | | 1 |

| Mix | a | b | c | d |
|---|---|---|---|---|
| Time in hours to attain $O_2$-uptake of: | | | | |
| 0.5% | 22.3 | 25.6 | 24.5 | 29.5 |
| 1.0% | 40.7 | 47.5 | 44.0 | 54.5 |

Example 2

The following compounds were prepared in the conventional manner.

| Mix | E | F | G | H |
|---|---|---|---|---|
| Pale crepe rubber | 100 | 100 | 100 | 100 |
| Zinc oxide | 10 | 10 | 10 | 10 |
| Blanc fixe | 75 | 75 | 75 | 75 |
| Stearic acid | 1 | 1 | 1 | 1 |
| Titanium dioxide | 10 | 10 | 10 | 10 |
| Sulphur | 2.0 | 2.0 | 2.0 | 2.0 |
| Zinc diethyldithiocarbamate | 0.375 | 0.375 | 0.375 | 0.375 |
| N:N'-di-β-naphthyl-p-phenylenediamine | 2 | 1 | 1 | 0.95 |
| 2-mercaptobenzimidazole | | 1 | 0.9 | 0.95 |
| 8-hydroxyquinoline | | | 0.1 | |
| p-aminophenol | | | | 0.1 |
| Copper stearate | 0.2 | 0.2 | 0.2 | 0.2 |

These mixes were vulcanised for 12 minutes at 125° C.

The antioxidant effect was measured by determining the tensile strengths of ring-shaped test pieces which had been aged for varying periods in an oxygen bomb under 300 p.s.i. oxygen pressure at 70° C.; curves were drawn for each mix, of tensile strength against duration of ageing and from the curves was interpolated the time in days for the tensile strength to fall to 50% of the unaged sample.

The following results were obtained:

| Mix | E | F | G | H |
|---|---|---|---|---|
| t-50% period | 9.2 | 16.0 | 16.4 | 17.0 |

*Example 3*

The following mixes were prepared in the conventional manner:

| Mix | J | K | L |
|---|---|---|---|
| Pale crepe rubber | 100 | 100 | 100 |
| Zinc oxide | 10 | 10 | 10 |
| Blanc fixe | 75 | 75 | 75 |
| Stearic acid | 1 | 1 | 1 |
| Titanium dioxide | 10 | 10 | 10 |
| Sulphur | 2.5 | 2.5 | 2.5 |
| 2-mercaptobenzthiazole | 0.5 | 0.5 | 0.5 |
| N:N'-di-β-naphthyl-p-phenylenediamine | 2 | 1 | 1 |
| 2-mercaptobenzimidazole | | 0.85 | 1 |
| Disalicylal ethylene diamine | | 0.15 | |
| Copper stearate | 0.2 | 0.2 | 0.2 |

These mixes were vulcanised for 30 minutes at 141° C. and the antioxidant effect was measured as in Example 2.

The following results were obtained:

| Mix | J | K | L |
|---|---|---|---|
| t-50% period in days | 8.2 | 13.7 | 11.8 |

*Example 4*

The following mixes were prepared in the conventional manner:

| Mix | M | N | P | Q | R |
|---|---|---|---|---|---|
| Pale crepe rubber | 100 | 100 | 100 | 100 | 100 |
| Zinc oxide | 10 | 10 | 10 | 10 | 10 |
| Blanc fixe | 75 | 75 | 75 | 75 | 75 |
| Stearic acid | 1 | 1 | 1 | 1 | 1 |
| Sulphur | 3.0 | 3.0 | 3.0 | 3.0 | 3.0 |
| Diphenylguanidine | 0.5 | 0.5 | 0.5 | 0.5 | 0.5 |
| Copper stearate | 0.2 | 0.2 | 0.2 | 0.2 | 0.2 |
| N:N'-di-β-naphthyl-p-phenylenediamine | 2 | 1 | | | |
| N-cyclohexyl-N'-phenyl-p-phenylenediamine | | | 2 | 1 | 1 |
| p-Aminophenol | | | | | 0.1 |
| 2-mercaptobenzimidazole | | 1 | | 1 | 0.9 |

The mixes M and N were vulcanised for 75 minutes at 141° C. and tested by the bomb ageing method discribed in Example 2. The mixes P, Q and R were vulcanised for 150 minutes at 141° C. and tested by the oxygen-absorption method described in Example 1.

The following results were obtained:

| Mix | M | N |
|---|---|---|
| t-50% period in days | 6.0 | 13.0 |

| Mix | P | Q | R |
|---|---|---|---|
| Time in hours to attain oxygen uptake of 1.0% | 67 | 101 | 96 |

*Example 5*

The following mixes were prepared in the conventional manner:

| Mix | S | T | U | V |
|---|---|---|---|---|
| Pale crepe rubber | 100 | 100 | 100 | 100 |
| Copper stearate | 0.05 | 0.05 | 0.05 | 0.05 |
| 2-mercaptobenzimidazole | | 1 | | 1 |
| N:N'-di-β-naphthyl-p-phenylenediamine | 2 | 1 | | |
| N-cyclohexyl-N'-phenyl-p-phenylenediamine | | | 2 | 1 |

The above mixes were oxidised at 90° C. on stainless-steel gauze trays placed in the glass reaction cells of the oxygen-absorption apparatus as described in Example 1.

| Mix | S | T | U | V |
|---|---|---|---|---|
| Time in hours to obtain an oxygen uptake | 54.5 | 80.5 | 43 | 93 |

What we claim is:

1. A process for stabilizing against oxidation rubber, consisting of natural rubber, and copper, which process comprises incorporating into said rubber, prior to curing, a copper inhibiting system in a proportion of from .05% to 4% by weight of said rubber, said copper inhibiting system consisting essentially of (a) From 33⅓% to 66⅔%, by weight of a mercaptobenzimidazole selected from the group consisting of 2-mercaptobenzimidazole and its metal salts and 2:2'-dibenzimidazyl disulfide;

(b) From 33⅓% to 66⅔%, by weight, of a member selected from the group consisting of N:N'-disubstituted diaryl; alkyl, aryl; cycloalkyl, aryl; and dicyclohexyl p-phenylene diamines; and, additionally (c) From 3% to 10%, by weight based on (a) and (b), of disalicylal ethylene diamine.

2. The process of claim 1, wherein said (a) and (b) components of said copper inhibiting system are present in equal amounts.

3. A process as claimed in claim 1, wherein said mercaptobenzimidazole is 2-mercaptobenzimidazole.

References Cited in the file of this patent

UNITED STATES PATENTS 2,560,744    Rhines                July 17, 1951
2,727,014    Harbison            Dec. 13, 1955

OTHER REFERENCES

Compounding Ingredients for Rubber (2nd edition, 1947), printed by Conway Printing Co., Inc., New York, page 151, compiled by editors of India Rubber World, New York, New York.